United States Patent [19]

Aoi

[11] 3,860,403
[45] Jan. 14, 1975

[54] EXHAUST GAS PURIFYING APPARATUS FOR INTERNAL COMBUSTION ENGINES

[76] Inventor: Katashi Aoi, No. 840, Juniso, Kanagawa-ken, Kamakura-shi, Japan

[22] Filed: Aug. 14, 1973

[21] Appl. No.: 388,183

Related U.S. Application Data

[63] Continuation-in-part of Ser. No. 207,772, Dec. 14, 1971, abandoned.

[30] Foreign Application Priority Data

Oct. 13, 1972 Japan.............................. 47-117697

[52] U.S. Cl................ 55/269, 55/DIG. 30, 55/319, 55/485, 60/311
[51] Int. Cl............................................ B01d 50/00
[58] Field of Search............55/DIG. 30, 307, 308, 55/318–330, 476, 482, 485, 418, 55/269, 309, 462; 60/311

[56] References Cited
UNITED STATES PATENTS

| | | | |
|---|---|---|---|
| 1,606,032 | 11/1926 | Kolstrand............................ | 261/126 |
| 1,708,656 | 4/1929 | Bradshaw........................... | 122/491 |
| 1,746,774 | 2/1930 | Jenkins................................ | 55/322 |
| 1,874,326 | 8/1932 | Mason.................................. | 184/47 |
| 2,822,059 | 2/1958 | Lunn et al....................... | 55/485 UX |
| 2,984,315 | 5/1961 | Kleinecke............................ | 55/198 |
| 3,266,227 | 8/1966 | Plizak et al. ........................ | 55/426 |
| 3,326,198 | 6/1967 | Jackson et al. ..................... | 55/309 |
| 3,421,315 | 1/1969 | Aoi...................................... | 60/297 |
| 3,687,637 | 8/1972 | Okamura............................. | 23/288 |

FOREIGN PATENTS OR APPLICATIONS 588,279 2/1959 Italy..................................... 55/320

Primary Examiner—Bernard Nozick

[57] ABSTRACT

An exhaust gas purifier for internal combustion engines in which a purifying cylinder is divided into several stages each comprising an expansion chamber, a condensation chamber and a collection chamber. Adjacent stages are separated by an adiabatic plate having perforations for passage of the exhaust gas, whose diameter varies with different stages. The volume of the individual stages is also different. With such arrangement, contribution of each stage to total purification performance is different according to the gas flow and at maximum gas flow all the stages work equally well.

1 Claim, 4 Drawing Figures

EXHAUST GAS PURIFYING APPARATUS FOR INTERNAL COMBUSTION ENGINES

This application is a continuation-in-part of Ser. No. 207,772 filed Dec. 14, 1971 and now abandoned.

BACKGROUND OF THE INVENTION

This invention relates to an exhaust gas purifying apparatus for use with internal combustion engines for such as automobiles.

According to the aforesaid application an exhaust gas purifying apparatus for internal combustion engines has been described in which a purifying cylinder is divided into several stages by expansion chambers and condensation chambers with collection chambers therebetween filled with collecting material. Particularly an exhaust gas purifying apparatus which gives a special consideration to the relation between the exhaust gas flow and the purification performance has been described in which numerous perforations are provided through adiabatic plates which separate the above-mentioned expansion chambers and condensation chambers, the number of the perforations and the diameter thereof being different in successive stages of the apparatus.

In such a purifying apparatus, when the engine speed is low and the exhaust gas flow is small, only adiabatic plates having smaller diameter perforations and a smaller number of perforations favor adiabatic expansion to cool and condense the gas, but as the engine speed becomes higher and the gas flow increases, adiabatic plates having greater diameter perforations and a greater number of perforations are required to perform the function mentioned above. Therefore the purifying function is generally uniform and the drawback that a particular collection chamber maybe under overload decreasing its performance, which in turn degrades the performance of the whole purifying apparatus, can be avoided to a certain extent. Nevertheless such apparatus has the disadvantage that the function of the expansion and the condensation chambers is not maximized since their volumes are designed to be nearly equal inspite of the above-mentioned variation in the perforations in the adiabatic plates at different stages.

Such a disadvantage is avoided by the present invention.

The invention provides an exhaust gas purifying apparatus which always maintains good exhaust gas purifying functions despite a wide range of variation of exhaust gas flow ranging from low to high engine speed.

The invention is characterized by a purifying cylinder divided into several stages by a succession of expansion chambers, condensation chambers, and collection chambers filled with collecting material, and adiabatic plates separating and forming said expansion chamber and condensation chambers said plates being provided with perforations whose number and diameter are different for different stages and the volume of the expansion chambers, condensation chambers and collection chambers also varying for different stages.

The invention will now be described in more detail with reference to an embodiment thereof.

Brief Description of the Drawings

The attached drawing shows an embodiment of the invention, in which.

Preferred Embodiment of the Invention

Figure 1:
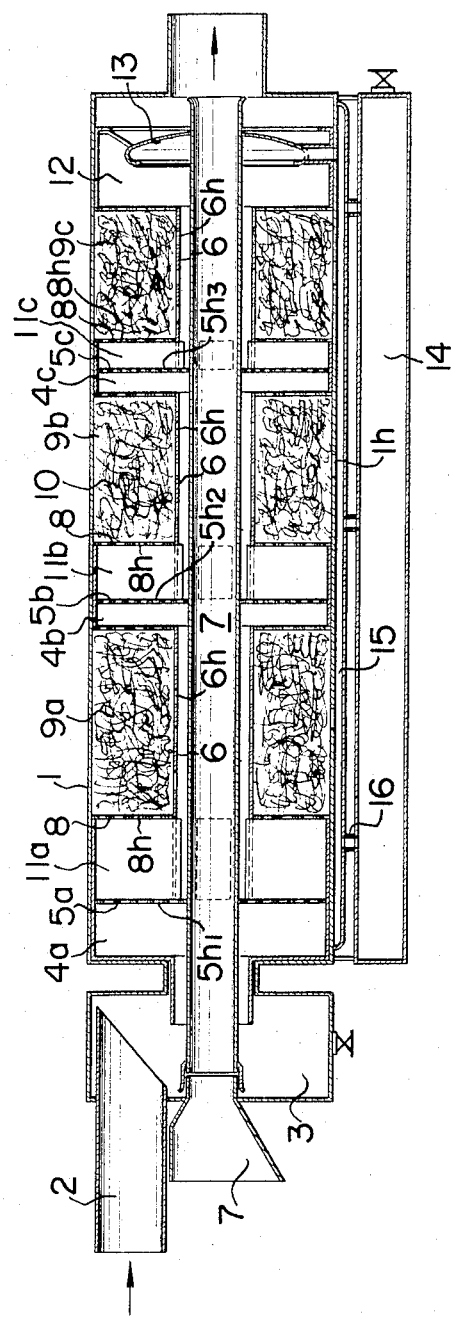
FIG. 1 is a cross-section cut through the center of the apparatus.
Figure 2:
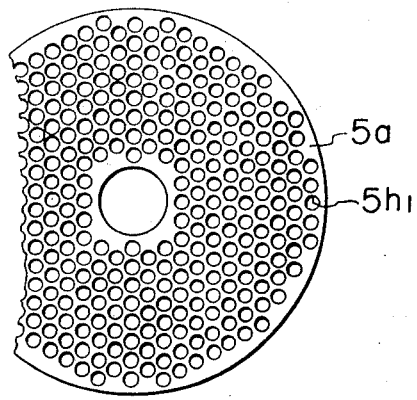
FIGS. 2, 3 and 4 show front views of the adiabatic plates, partially broken away.
Figure 3:
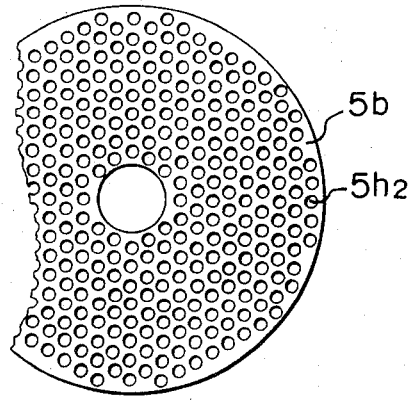
Figure 4:
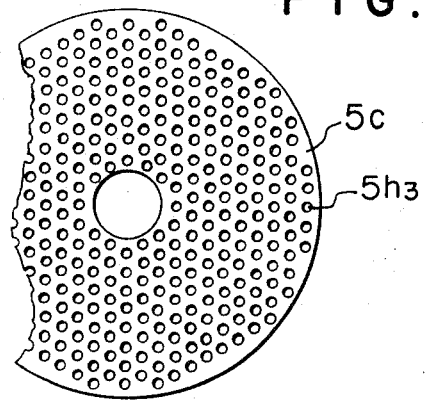

Referring to the drawings, the symbol 1 shows a purifying cylinder which forms the outer housing for the apparatus and contains the main part thereof, and 2 shows an inlet duct which leads the gas exhausted from an internal combustion engine to a pre-processing separation chamber 3. The gas first undergoes adiabatic expansion in said separation chamber 3 in the manner of a horizontal cyclone so that larger particles of poisonous and hazardous material in the gas will be taken off. 4a shows an adiabatic expansion chamber into which the gas is subsequently led. The rear side of the chamber is closed by an adiabatic plate 5a having many perforations $5h_1$, of small diameter.

The adiabatic plates $5a - 5c$ are arranged in plural stages from the forward to the rear ends of the cylinder as shown, the more rear adiabatic plates having smaller diameter perforations $5h_1$, $5h_2$, $5h_3$, and, if necessary, a less number of such perforations than each successive forward plate. Accordingly, the more rear adiabatic plates are more suitable to produce adiabatic expansion at less exhaust gas flow (lower speed of revolution) and, as the exhaust gas flow increases, the forward adiabatic plates add to this function, so that at the maximum exhaust gas flow all of the adiabatic plates work together.

Spaced from each of the adiabatic plates $5a - 5c$ are fixedly arranged communicating tubes 6 coaxial of the purifying cylinder 1 and having many vent holes $6h$. Inside of the communicating tubes 6 is a vent tube 7 extending longitudinally through the entire length of purifying cylinder 1 and each of tubes 6. the vent tube 7 is isolated from the interior of the purifying cylinder 1 and is open at each end for free passage of air longitudinally therethrough so as to cool the interior of the cylinder. The communicating tubes 6 are arranged in series rearwardly to form as many corresponding inner walls of collection chambers 9a, 9b, 9c, . . . to be described later. The adjacent communicating tubes 6 are partitioned by the adiabatic plates 5a, 5b, 5c, . . . .

At the forward ends of the individual communicating tubes 6 are internally fixed flange-shaped vent walls 8 having many vent holes $8h$ of large diameter, to form doughnut-shaped spaces around the communicating tubes 6, thus defining collecting chambers 9a, 9b, 9c, which are filled with heat-resistant cotton-like collecting material 10. With such a structure, the respective adiabatic plates $5a - 5c$ and the vent walls 8 form expansion chambers $4a - 4c$ and condensation chambers $11a - 11c$ arranged in plural stages.

It is to be noted that although in the present embodiment the rearward collecting chambers, expansion chambers and condensation chambers have smaller volume than the forward chambers, their order of position may be reversed in conjunction with the aforementioned variation of an appropriate diameter and number of perforations made through the adiabatic plates $5a - 5c$.

The symbol 12 shows an exhaust chamber, behind which is attached a gas — deflecting wall 13 having a round bottom, whereby to change the passage of gas issuing from the last stage communicating tube 6 and vent wall 8. The exhaust gas strikes the deflecting wall 13 on the way out.

A reservoir tank 14 is provided to store liquid condensed in the cylinder 1, which liquid is led to the tank through a suitable number of drain holes 1h provided through the under side of the outer wall of the cylinder 1, a drain chamber 15 and then through an outlet conduit 16.

In the apparatus described above, the gas flows through the expansion chamber, the condensation chamber and then the collection chamber in each stage. The action of the apparatus varies according to the gas flow, that is, only at the maximum flow of the exhaust gas, the most forward adiabatic plate 5a effects adiabatic operation, but as the exhaust gas flow decreases only rearward plates can work. During the process, the gas passes through the adiabatic plates 5a, 5b, 5c and the collecting material 10, whereby some part of the gas is condensed and carbon particles and heavy metal such as lead in the gas is collected in the collection chamber so that the gas can be thoroughly purified and exhausted out of the cylinder. In the apparatus of the invention, almost all of the exhaust gas is made to pass through the collecting material 10 at least once. In addition the interior of the cylinder 1 is penetrated by the communicating tube 6. So even if the purifying function of any of the collection chambers is deteriorated, it does not result in limiting the ability of the whole apparatus. It is also noted that as the flow of the exhaust gas increases, the adiabatic plates having bigger diameter of perforations add to serve the adiabatic function and at the same time the collection chambers, expansion chambers and condensation chambers having larger volume add to serve purifying function whereby each collection chamber is used in the most suitable condition under constant load and therefore gives the great advantage of enhancing the durability of the collecting material.

An alternative embodiment may include an adiabatic plate having perforations of different diameters to present varying adiabatic operation according to the exhaust gas flow. The cooling gas for the vent tube 7 may be given by a natural ventilation as in the case of an automobile, it may also be given by a force ventilation by providing a fan (not shown) at the inlet port.

What is claimed is:

1. An exhaust gas purifying apparatus for an internal combustion engine comprising a cylinder divided into a plurality of successive stages for expansion, condensation and collection of impurities, each such stage having successively in the direction of gas flow (a) an annular expansion chamber and (b) annular condensation chamber separated from one another by an annular perforated adiabatic plate, and (c) an annular collecting chamber separated from the condensation chamber by an annular perforated wall and containing a heat resistant collecting material, means transmitting the exhaust gas received from the engine to an annular expansion chamber of a first stage located at a forward end of the cylinder, the exhaust gas flowing through this stage being delivered from the annular collecting chamber to the annular expansion chamber of the next succeeding stage and passing in like manner from succeeding stage to succeeding stage to be delivered to the annular expansion chamber of the last of said stages located at the rear end of the cylinder, second means delivering an exhaust portion of said cylinder and located at the rear end thereof, the annular collecting chamber of said last stage delivering exhaust gas to said exhaust portion, the volume of the chambers and the size of the perforations in said adiabatic plates progressive decreasing from stage to stage the direction from the first stage toward the last stage to compensate for variations in the flow of exhaust gas, and a cooling tube extending along the central axis of the cylinder to cool the gas as it progresses through the apparatus said tube being open to the atmosphere at the forward end of the cylinder and in communication with exhaust portion at the rear end of the cylinder.

* * * * *